United States Patent
Zheng

(10) Patent No.: US 12,216,352 B2
(45) Date of Patent: Feb. 4, 2025

(54) DISPLAY DEVICE

(71) Applicant: Huizhou China Star Optoelectronics Display Co., Ltd., Guangdong (CN)

(72) Inventor: Weiwei Zheng, Guangdong (CN)

(73) Assignee: Huizhou China Star Optoelectronics Display Co., Ltd., Huizhou (CN)

( * ) Notice: Subject to any disclaimer, the term of this patent is extended or adjusted under 35 U.S.C. 154(b) by 0 days.

(21) Appl. No.: 17/600,146

(22) PCT Filed: Aug. 19, 2021

(86) PCT No.: PCT/CN2021/113413
§ 371 (c)(1),
(2) Date: Sep. 30, 2021

(87) PCT Pub. No.: WO2022/252405
PCT Pub. Date: Dec. 8, 2022

(65) Prior Publication Data
US 2024/0027824 A1    Jan. 25, 2024

(30) Foreign Application Priority Data

Jun. 4, 2021 (CN) .......................... 202110624152.9

(51) Int. Cl.
*G02F 1/1335*    (2006.01)
(52) U.S. Cl.
CPC .. *G02F 1/133528* (2013.01); *G02F 1/133531* (2021.01); *G02F 1/133538* (2021.01)

(58) Field of Classification Search
None
See application file for complete search history.

(56) References Cited

U.S. PATENT DOCUMENTS

| | | | |
|---|---|---|---|
| 10,139,548 B2 * | 11/2018 | Yamaguchi | ......... G02F 1/13362 |
| 2020/0403186 A1 | 12/2020 | Choi et al. | |
| 2022/0283351 A1 * | 9/2022 | Shibata | ............... G02F 1/13363 |

FOREIGN PATENT DOCUMENTS

| | | |
|---|---|---|
| CN | 108303812 | 7/2018 |
| CN | 108881538 | 11/2018 |
| CN | 110927970 | 3/2020 |
| CN | 111095288 | 5/2020 |
| CN | 111439204 | 7/2020 |
| CN | 211087263 | 7/2020 |
| CN | 112133723 | 12/2020 |
| CN | 112629655 | 4/2021 |

* cited by examiner

*Primary Examiner* — Dung T Nguyen

(57) ABSTRACT

A display device is provided. The display device includes a display panel, a sensor, and a polarizer. A polarization direction of light emitted from the display device to the sensor includes, at least, a first polarization direction. The first polarization direction is parallel to an absorption axis of the polarizer. By absorbing stray light parallel to the absorption axis of the polarizer, a luminous flux of the stray light emitted to the sensor is reduced, and a light receiving quality of the sensor is improved.

14 Claims, 8 Drawing Sheets

DISPLAY DEVICE

RELATED APPLICATIONS

This application is a National Phase of PCT Patent Application No. PCT/CN2021/113413 having International filing date of Aug. 19, 2021, which claims the benefit of priority of Chinese Patent Application No. 202110624152.9 filed on Jun. 4, 2021. The contents of the above applications are all incorporated by reference as if fully set forth herein in their entirety.

FIELD AND BACKGROUND OF THE INVENTION

This application relates to display technologies, and more particularly, to a display device.

In recent years, more and more display devices are integrated with front sensors. Currently, a plurality of membranes may be arranged between a sensor and a display panel, and the membranes may inevitably reflect light emitted by a display device to enter the sensor. Thus, the light is superposed with an external incoming light, so that a light collection quality of the sensor is reduced. For example, a contrast ratio of light received by a camera is reduced, and a light receiving quality of the sensor is affected.

Therefore, there is an urgent need for a display device to solve the above-described technical problem.

SUMMARY OF THE INVENTION

Embodiments of the present invention provide a display device for solving the technical problem of low light receiving quality of a current sensor.

To resolve the foregoing problem, the technical solutions adopted by this application are as follows:

Embodiments of this application provide a display device. The display device comprises a display panel, a sensor disposed at a first side of the display panel, and a polarizer disposed between the sensor and the display panel. Ambient light is emitted to the sensor through the display panel and the polarizer.

A polarization direction of light emitted from the display device to the sensor comprises, at least, a first polarization direction. The first polarization direction is parallel to an absorption axis of the polarizer.

In an embodiment, the display panel comprises a first polarizing layer disposed on a side of the display panel close to the sensor, a second polarizing layer disposed on a side of the display panel away from the sensor, and a liquid crystal layer disposed between the first polarizing layer and the second polarizing layer. An absorption axis of the first polarizing layer is perpendicular to an absorption axis of the second polarizing layer. The absorption axis of the polarizer is parallel to the absorption axis of the first polarizing layer.

In an embodiment, the display device comprises a first via hole. The first via hole penetrates through the first polarizing layer, the second polarizing layer, and the liquid crystal layer.

In an embodiment, the display device further comprises a third polarizing layer disposed between the first polarizing layer and the polarizer. The third polarizing layer comprises a semi-reflective and semi-transmissive material. A transmission axis and a reflection axis of the third polarizing layer are perpendicular to each other. The reflection axis of the third polarizing layer is parallel to the absorption axis of the first polarizing layer.

In an embodiment, the display device comprises a first via hole. The first via hole penetrates through the first polarizing layer, the second polarizing layer, the liquid crystal layer, and the third polarizing layer.

In an embodiment, an orthographic projection of the first via hole on the sensor is located within the sensor.

In an embodiment, the third polarizing layer comprises a Dual Brightness Enhancement Film (DBEF) material.

In an embodiment, the third polarizing layer and the first polarizing layer are integrally compounded.

In an embodiment, the third polarizing layer comprises an Advanced Polarization Conversion Film (APCF) material.

In an embodiment, the display panel comprises a fourth polarizing layer disposed on a side of the display panel close to the sensor, a second polarizing layer disposed on a side of the display panel away from the sensor, and a liquid crystal layer disposed between the fourth polarizing layer and the second polarizing layer. The fourth polarizing layer comprises a semi-reflective and semi-transmissive material. A transmission axis and a reflection axis of the fourth polarizing layer are perpendicular to each other. The transmission axis of the fourth polarizing layer is perpendicular to an absorption axis of the second polarizing layer.

In an embodiment, the fourth polarizing layer comprises an APCF material.

In an embodiment, the display device comprises a first via hole. The first via hole penetrates through a first polarizing layer, the second polarizing layer, the liquid crystal layer, and the fourth polarizing layer.

In an embodiment, the display device further comprises a backlight module disposed between the polarizer and the display panel.

In an embodiment, a distance between the polarizer and the sensor is smaller than a distance between the polarizer and the backlight module.

In an embodiment, the polarizer comprises an arc surface. A convex surface of the arc surface faces away from the sensor.

In an embodiment, the polarizer comprises a first portion parallel to the display panel and a second portion connected with the first portion and surrounding the sensor.

In an embodiment, the polarizer and the sensor are integrated.

In an embodiment, the polarizer comprises a first threaded component connected with the sensor. The sensor comprises a second threaded component fitted with the first threaded component.

In an embodiment, the display device further comprises a bonding layer disposed between the sensor and the polarizer. The bonding layer is disposed annularly.

In an embodiment, the sensor comprises any one or a combination of a camera, an optical fingerprint reader, an infrared sensor, and a distance sensor.

According to the embodiments of the present invention, the polarizer is added between the sensor and the display panel to absorb stray light parallel to the absorption axis of the polarizer, so that a luminous flux of the stray light emitted to the sensor is reduced, and a light receiving quality of the sensor is improved.

DESCRIPTION OF SPECIFIC EMBODIMENTS OF THE INVENTION

A display device is provided in this application. To make the objectives, technical solutions and the advantages of this application clearer, this application is further described below in detail with reference to the accompanying drawings and embodiments.

Embodiments of this application provide a display device. The embodiments will be described in detail below respectively. It should be noted that a description order of the following embodiments is not intended as a limitation on a preferred order of the embodiments.

Figure 1:
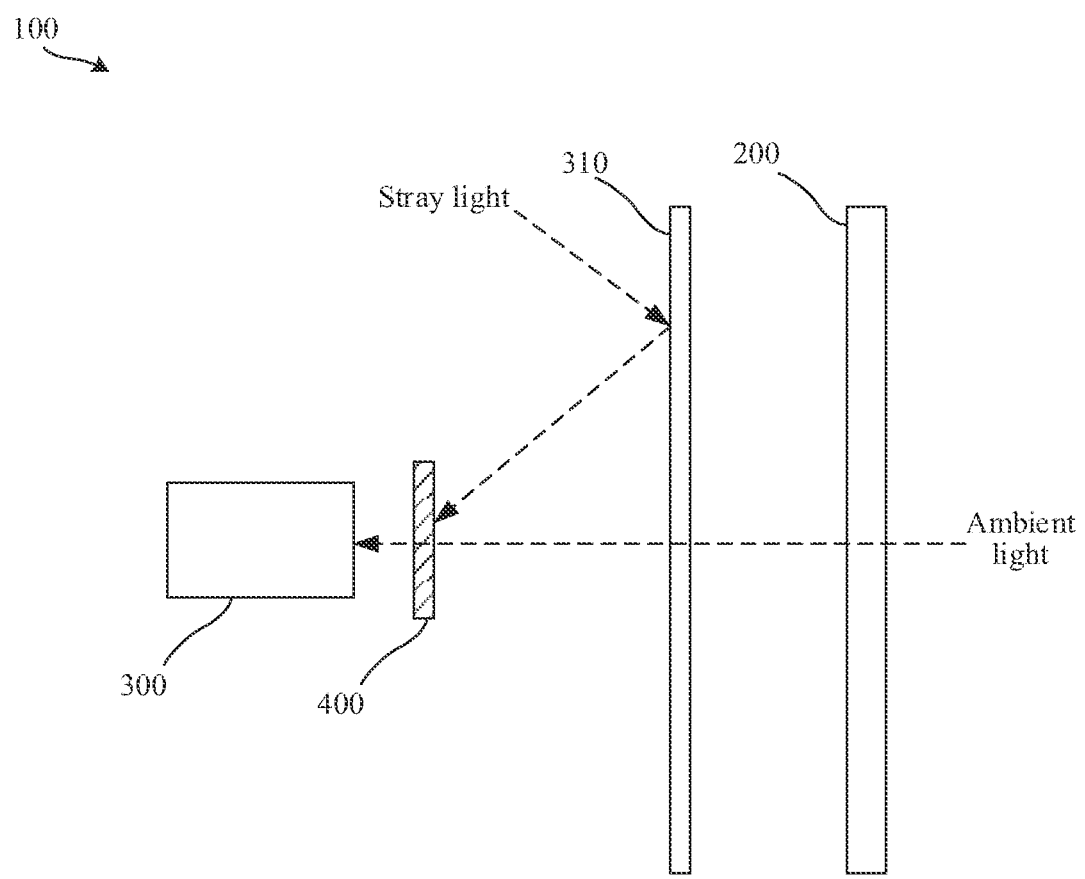
FIG. 1 is a schematic local structure view of a first structure of a display device according to an embodiment of the present invention.

Referring to FIG. 1, an embodiment of the present invention provides a display device 100, including a display panel 200, a sensor 300 disposed at a first side of the display panel 200, and a polarizer 400 disposed between the sensor 300 and the display panel 200. Ambient light is emitted to the sensor 300 through the display panel 200 and the polarizer 400. A polarization direction of light emitted from the display device 100 to the sensor 300 includes, at least, a first polarization direction. The first polarization direction is parallel to an absorption axis of the polarizer 400.

According to the embodiments of the present invention, the polarizer is added between the sensor and the display panel to absorb stray light parallel to the absorption axis of the polarizer, so that a luminous flux of the stray light emitted to the sensor is reduced, and a light receiving quality of the sensor is improved.

The technical solution of the present invention will now be described with reference to specific embodiments.

The display device 100 includes a display panel 200, a sensor 300 disposed at a first side of the display panel 200, and a polarizer 400 disposed between the sensor 300 and the display panel 200. Ambient light is emitted to the sensor 300 through the display panel 200 and the polarizer 400. A polarization direction of light emitted from the display device 100 to the sensor 300 includes, at least, a first polarization direction. The first polarization direction is parallel to an absorption axis of the polarizer 400. The ambient light is emitted to the display panel 200, passes through the display panel 200 and the first side, is emitted to the polarizer 400, and finally reaches the sensor 300, referring particularly to FIG. 1.

Figure 2:
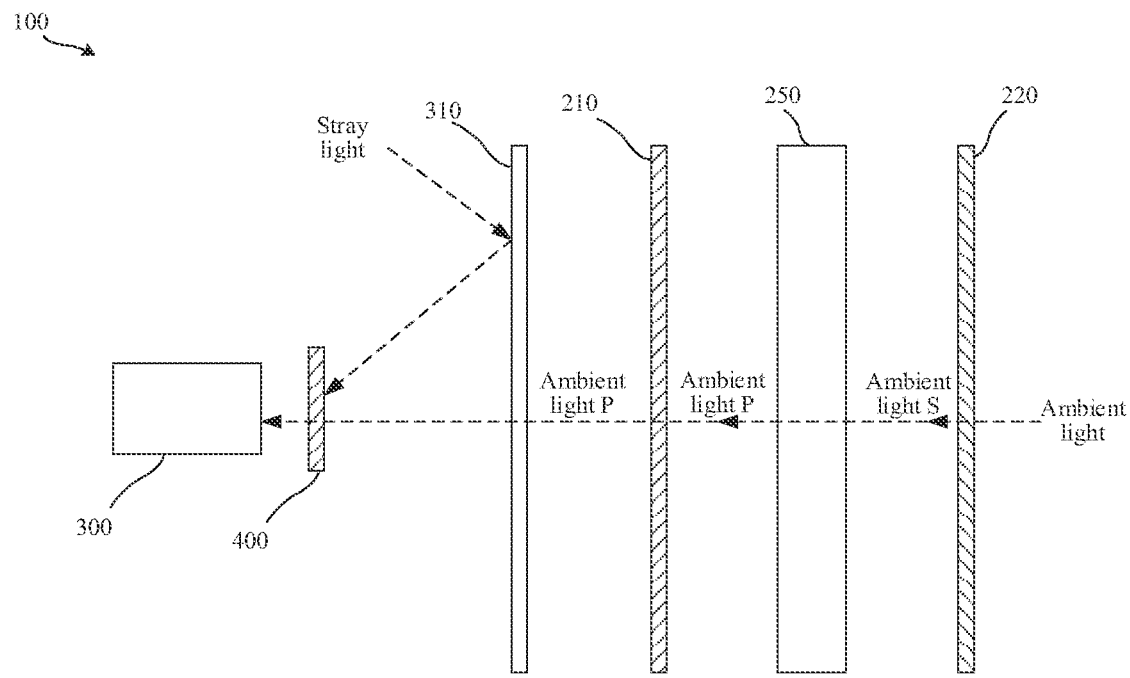
FIG. 2 is a schematic local structure view of a second structure of a display device according to an embodiment of the present invention.

According to the present embodiment, by adding the polarizer 400 between the sensor and the display panel 200, the ambient light may enter the sensor 300 through the polarizer 400. A polarizing layer with an absorption axis may absorb polarized light parallel to the absorption axis and allow the passage of polarized light perpendicular to the absorption axis. That is, the ambient light includes, at least, light polarized perpendicularly to the absorption axis of the polarizer 400 when passing through the polarizer 400. The light emitted from the display device 100 to the sensor 300 may be stray light. The stray light includes light directly emitted to the sensor 300 and/or light reflected by any membrane in the display device 100 and emitted to the sensor 300. A polarization direction of the stray light includes, at least, a first polarization direction. The first polarization direction is parallel to the absorption axis of the polarizer 400. At least part of the stray light may be absorbed. For example, the first polarization direction is direction S. The absorption axis of the polarizer 400 absorbs light S. A luminous flux of the stray light emitted to the sensor can be reduced, and a light receiving quality of the sensor can be improved, referring particularly to FIG. 1 and FIG. 2.

In the present embodiment, for convenience of explanation, an absorption axis of a first polarizing layer 210 is in direction S, i.e., absorbs light S, and transmits light P. An absorption axis of a second polarizing layer 220 is in direction P, i.e., absorbs light P, and transmits light S, referring particularly to FIG. 1 and FIG. 2.

Figure 3:
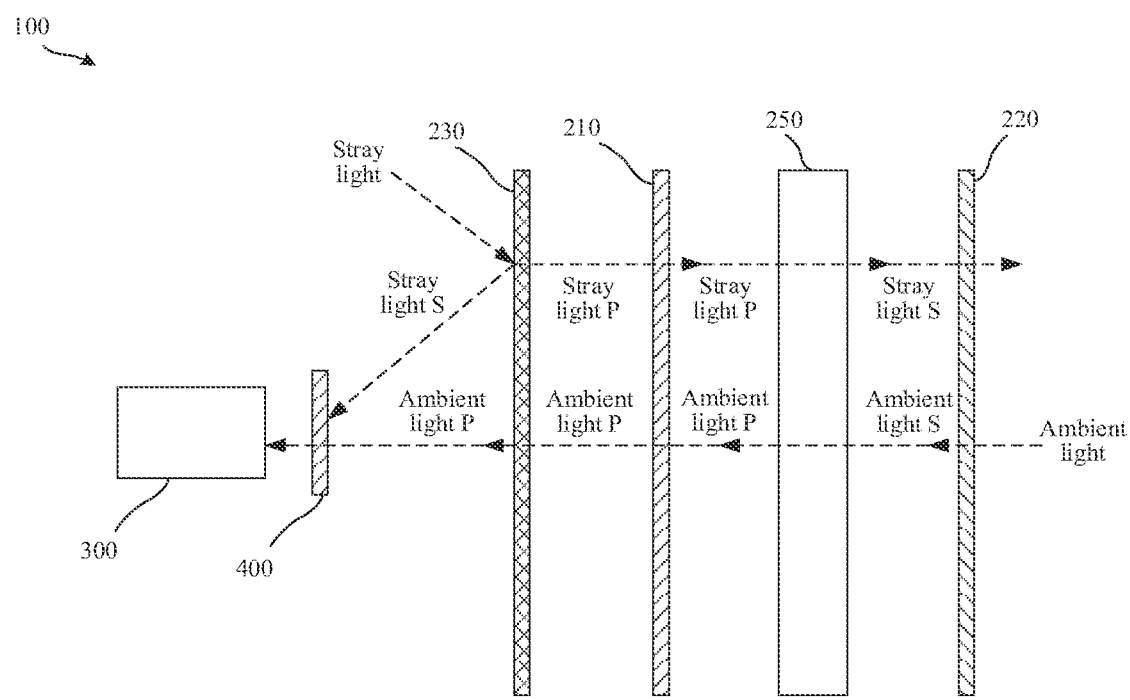
FIG. 3 is a schematic local structure view of a third structure of a display device according to an embodiment of the present invention.
Figure 4:
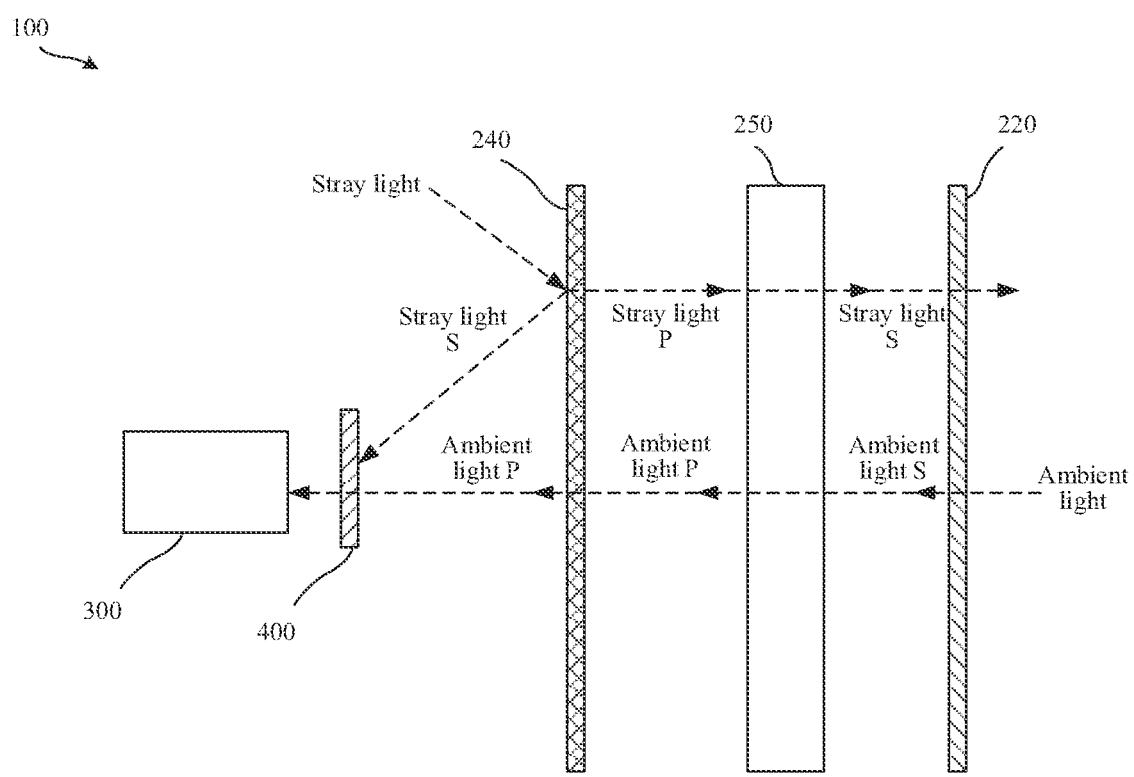
FIG. 4 is a schematic local structure view of a fourth structure of a display device according to an embodiment of the present invention.
Figure 5:
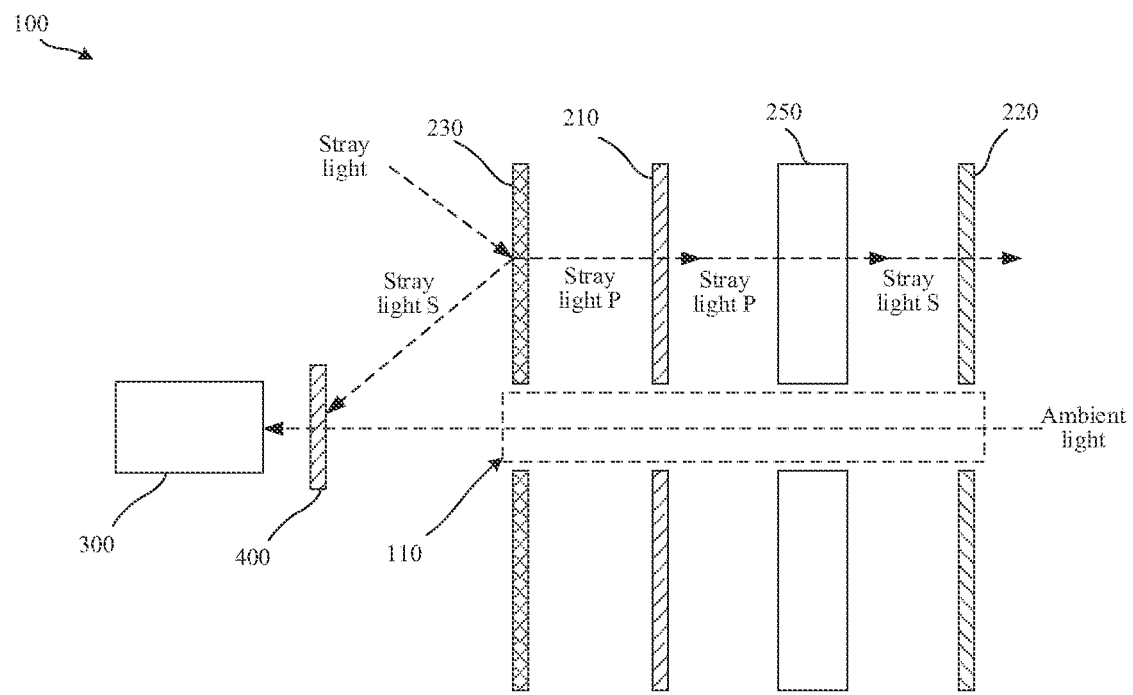
FIG. 5 is a schematic local structure view of a fifth structure of a display device according to an embodiment of the present invention.
Figure 6:
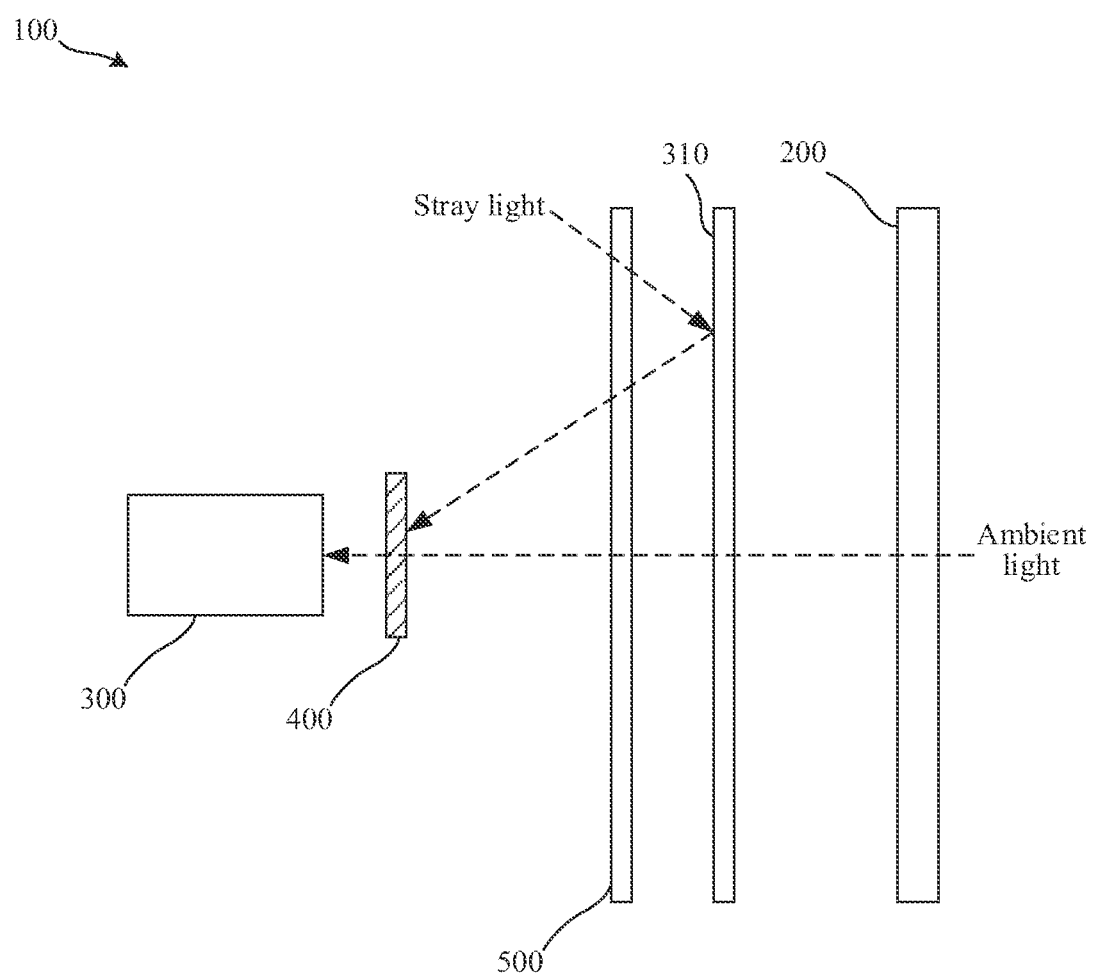
FIG. 6 is a schematic local structure view of a sixth structure of a display device according to an embodiment of the present invention.
Figure 7:
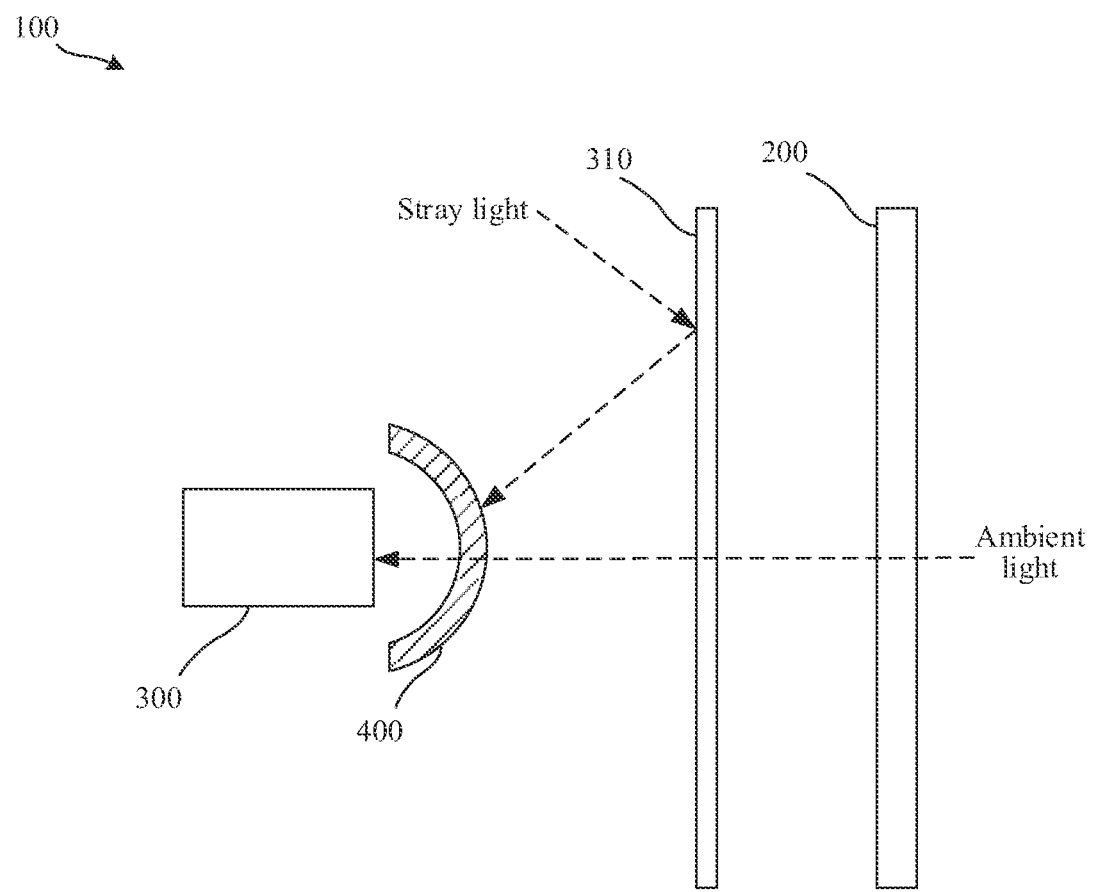
FIG. 7 is a schematic local structure view of a seventh structure of a display device according to an embodiment of the present invention.

In the present embodiment, in FIG. 1, FIG. 2, and FIG. 6 to FIG. 9, a first membrane 310 is exemplified. The stray light is reflected toward the polarizer 400 and the sensor 300 after being emitted to the first membrane 310. In FIG. 3 to FIG. 5, a third polarizing layer 230 or a fourth polarizing layer 240 is exemplified. The stray light is reflected toward the polarizer 400 and the sensor 300 after being emitted to the third polarizing layer 230 or the fourth polarizing layer 240.

In the present embodiment, the display panel 200 includes a first polarizing layer 210 disposed on a side of the display panel close to the sensor 300, a second polarizing layer 220 disposed on a side of the display panel away from the sensor 300, and a liquid crystal layer 250 disposed between the first polarizing layer 210 and the second polarizing layer 220. An absorption axis of the first polarizing layer 210 is perpendicular to an absorption axis of the second polarizing layer 220. The absorption axis of the polarizer 400 is parallel to the absorption axis of the first polarizing layer 210. For example, after the ambient light passes through the second polarizing layer 220 and the first polarizing layer 210, the ambient light is light P. That is, the absorption axis of the first polarizing layer 210 absorbs light S, the polarizer 400 also absorbs light S, and the ambient light (light P) is not absorbed, so that the ambient light (light P) may smoothly enter the sensor 300. The stray light may belong to circularly polarized light. After the stray light passes through the polarizer 400, the luminous flux may be absorbed by half, so that the luminous flux of the stray light emitted to the sensor can be reduced, and the light receiving quality of the sensor can be improved, referring particularly to FIG. 2.

In the present embodiment, the display device 100 further includes a third polarizing layer 230 disposed between the first polarizing layer 210 and the polarizer 400. The third polarizing layer 230 includes a semi-reflective and semi-transmissive material. A transmission axis and a reflection axis of the third polarizing layer 230 are perpendicular to each other. The reflection axis of the third polarizing layer 230 is parallel to the absorption axis of the first polarizing layer 210. The display device 100 further includes a backlight module 500. The backlight module 500 is located between the sensor 300 and the third polarizing layer 230. For the third polarizing layer 230 including the semi-reflective and semi-transmissive material, the third polarizing layer 230 may transmit polarized light parallel to the transmission axis and may reflect polarized light parallel to the reflection axis. The third polarizing layer 230 reflects part of the stray light toward the polarizer 400 and toward the sensor 300. The third polarizing layer 230 transmits part of the stray light toward the first polarizing layer 210. A principle and a polarization direction of the corresponding light are as described above. The reflection axis of the third polarizing layer 230 is parallel to the absorption axis of the first polarizing layer 210, referring particularly to FIG. 3.

For example, in terms of ambient light, the ambient light is ambient light P after passing through the second polarizing layer 220, the liquid crystal layer 250, and the first polarizing layer 210. That is, the absorption axis of the first polarizing layer 210 absorbs light S. After the ambient light P reaches the third polarizing layer 230, the ambient light P may be projected toward the polarizer 400, and the polarizer 400 also absorbs light S instead of the ambient light P, so that the ambient light P may smoothly enter the sensor 300. In terms of stray light, the stray light is stray light P after being transmitted by the third polarizing layer 230. The stray light P may penetrate through the first polarizing layer 210 and normally enter the liquid crystal layer 250 to participate in normal display. The stray light is stray light S after being reflected by the third polarizing layer 230, and is emitted to the polarizer 400. The polarizer 400 absorbs light S. Therefore, most of the stray light S emitted to the polarizer 400 will be absorbed. The stray light is maximally reduced, and the light receiving quality of the sensor is improved, referring particularly to FIG. 3.

In the present embodiment, a material of the third polarizing layer 230 may include a DBEF. The DBEF is a reflective polarizer material capable of improving luminous efficiency.

In the present embodiment, the third polarizing layer 230 and the first polarizing layer 210 are integrally compounded. The third polarizing layer 230 and the first polarizing layer 210 may be integrated so as to reduce a film thickness. The first polarizing layer 210 and the third polarizing layer 230 may be combined. At this moment, the material of the third polarizing layer 230 may include an APCF. The third polarizing layer 230 and the first polarizing layer 210 may be compounded. Thus, a thickness of the first polarizing layer 210 is reduced, and a film layer process is reduced.

In the present embodiment, the display panel 200 includes a fourth polarizing layer 240 disposed on a side of the display panel close to the sensor 300, a second polarizing layer 220 disposed on a side of the display panel away from the sensor 300, and a liquid crystal layer 250 disposed between the fourth polarizing layer 240 and the second polarizing layer 220. The fourth polarizing layer 240 includes a semi-reflective and semi-transmissive material. A transmission axis and a reflection axis of the fourth polarizing layer 240 are perpendicular to each other. The transmission axis of the fourth polarizing layer 240 is perpendicular to the absorption axis of the second polarizing layer 220. The display device 100 further includes a backlight module 500. The backlight module 500 is located between the sensor 300 and the fourth polarizing layer 240. For the fourth polarizing layer 240 including the semi-reflective and semi-transmissive material, the fourth polarizing layer 240 may transmit polarized light parallel to the transmission axis and may reflect polarized light parallel to the reflection axis. The fourth polarizing layer 240 reflects part of the stray light toward the polarizer 400 and toward the sensor 300. The fourth polarizing layer 240 transmits part of the stray light toward the liquid crystal layer 250. A principle and a polarization direction of the corresponding light are as described above. The transmission axis of the fourth polarizing layer 240 is perpendicular to the absorption axis of the second polarizing layer 220, referring particularly to FIG. 4.

For example, in terms of ambient light, the ambient light is ambient light P after passing through the second polarizing layer 220 and the liquid crystal layer 250. That is, the absorption axis of the second polarizing layer 220 absorbs light P and transmits light S. Light S is deflected into ambient light P by the liquid crystal layer 250. After the ambient light P reaches the fourth polarizing layer 240, the ambient light P may be projected toward the polarizer 400, and the polarizer 400 also absorbs light S instead of the ambient light P, so that the ambient light P may smoothly enter the sensor 300. In terms of stray light, the stray light is stray light P after being transmitted by the fourth polarizing layer 240. The stray light P is deflected into stray light S by the liquid crystal layer 250. The absorption axis of the second polarizing layer 220 absorbs light P and transmits light S, so that the stray light S may pass through and participate in normal display. The stray light is stray light S after being reflected by the fourth polarizing layer 240, and is emitted to the polarizer 400. The polarizer 400 absorbs light S. Therefore, most of the stray light S emitted to the polarizer 400 will be absorbed. The stray light is maximally reduced, and the light receiving quality of the sensor is improved, referring particularly to FIG. 4.

In the present embodiment, the material of the fourth polarizing layer 240 may include an APCF. The fourth polarizing layer 240 may be disposed instead of the first polarizing layer 210. Thus, a thickness of the first polarizing layer 210 is reduced, and a film layer process is reduced.

In the present embodiment, the display device 100 includes a first via hole 110. The first via hole 110 penetrates through the first polarizing layer 210, the second polarizing layer 220, and the liquid crystal layer 250. Alternatively, the first via hole 110 penetrates through the first polarizing layer 210, the second polarizing layer 220, the liquid crystal layer 250, and the third polarizing layer 230. Alternatively, the first via hole 110 penetrates through the first polarizing layer 210, the second polarizing layer 220, the liquid crystal layer 250, and the fourth polarizing layer 240, referring particularly to FIG. 5.

In the present embodiment, an orthographic projection of the first via hole 110 on the sensor 300 is located within the sensor 300, referring particularly to FIG. 5. FIG. 5 illustrates the first via hole 110 penetrating through the first polarizing layer 210, the second polarizing layer 220, the liquid crystal layer 250, and the third polarizing layer 230. Other embodiments are easy to understand, and no figure is repeatedly drawn. The first via hole 110 may penetrate through each of the polarizing layers and the liquid crystal layer 250, thereby improving lighting efficiency of the sensor 300.

In the present embodiment, the first via hole 110 only penetrates through the third polarizing layer 230 or the fourth polarizing layer 240, so that normal light emission display can be realized in a region of the sensor 300, and normal display of an in-screen sensor 300 can be realized as well as without the first via hole 110, while the lighting efficiency of the sensor 300 is improved.

In the present embodiment, the display device 100 further includes a backlight module 500 disposed between the polarizer 400 and the display panel 200. A distance between the polarizer 400 and the sensor 300 is smaller than a distance between the polarizer 400 and the backlight module 500, referring particularly to FIG. 6. In the present embodiment, a specific position of the backlight module 500 is not limited. The backlight module may be closely attached to the display panel 200, may be integrated with the display panel 200, or may be spaced from the display panel 200. The polarizer 400 is closer to the sensor 300, so that light filtering and reducing effects of the polarizer 400 can be more obvious, stray light is prevented from entering the sensor 300 from bypassing the polarizer 400 in other directions, the stray light is maximally reduced, and the light receiving quality of the sensor is improved.

In the present embodiment, the polarizer 400 includes an arc surface. A convex surface of the arc surface faces away from the sensor 300, referring particularly to FIG. 7. The polarizer 400 may be made in a shape of an arc surface, similar to a manner of surrounding the sensor 300. The configuration of the arc surface can prevent stray light in more directions from entering the sensor 300, maximally reduce the stray light, and improve the light receiving quality of the sensor.

Figure 8:
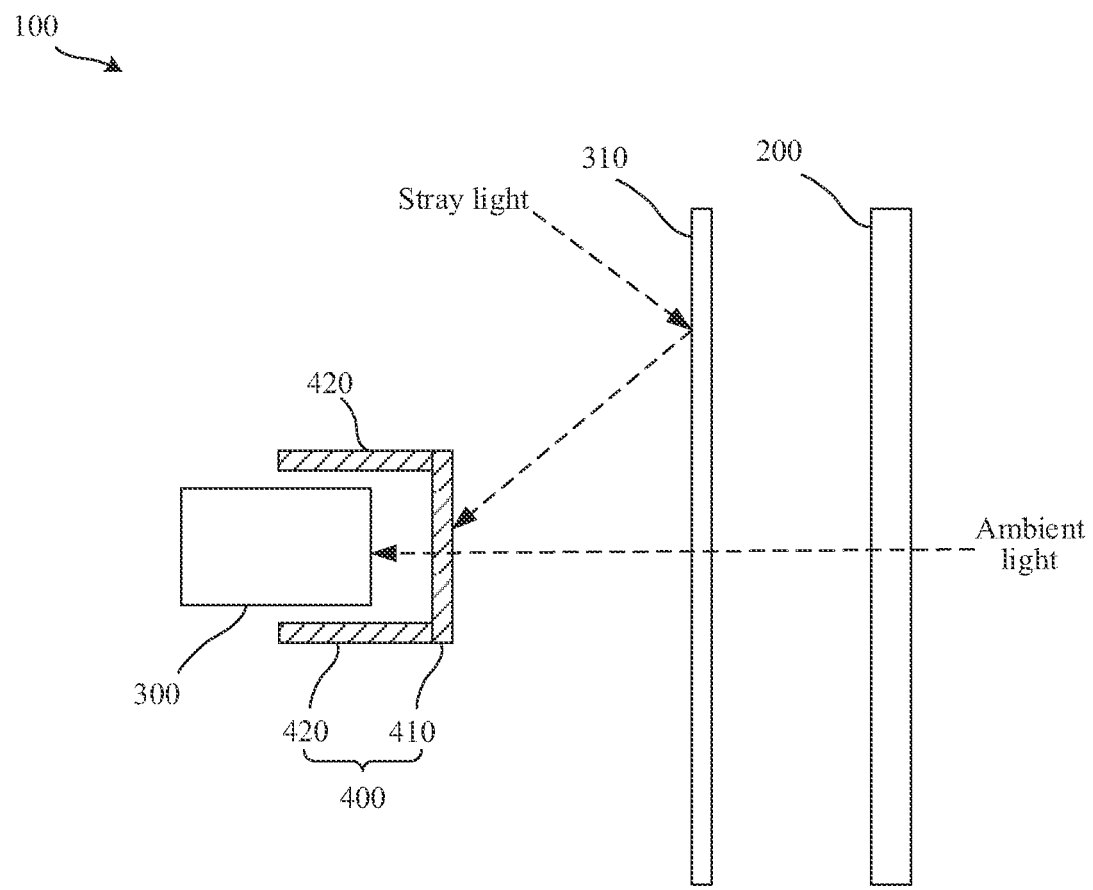
FIG. 8 is a schematic local structure view of an eighth structure of a display device according to an embodiment of the present invention.

In the present embodiment, the polarizer 400 includes a first portion 410 parallel to the display panel 200 and a second portion 420 connected with the first portion 410 and surrounding the sensor 300, referring particularly to FIG. 8. The polarizer 400 may present a structure of surrounding the sensor 300, thereby preventing the stray light in more directions from entering the sensor 300, maximally reducing the stray light, and improving the light receiving quality of the sensor.

Figure 9:
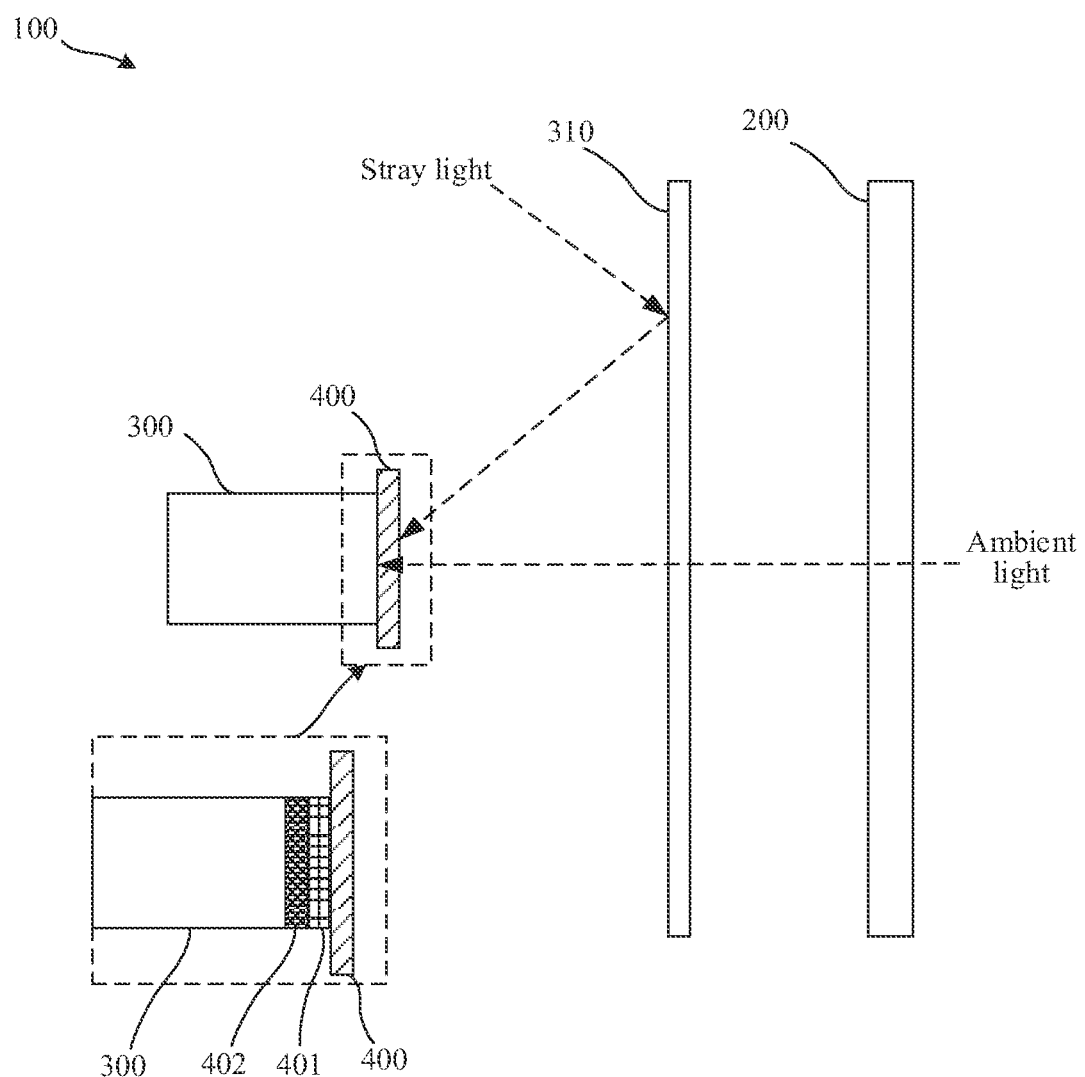
FIG. 9 is a schematic local structure view of a ninth structure of a display device according to an embodiment of the present invention.

In the present embodiment, the polarizer 400 and the sensor 300 are integrated, referring particularly to FIG. 9. The polarizer 400 and the sensor 300 are integrated. The sensor 300 may be integrated with the polarizer 400 during production, so that modular production is facilitated, production efficiency is favorably improved, and assembly time is shortened. Also, the structure of integration of the polarizer 400 and the sensor 300 prevents the stray light in more directions from entering the sensor 300, maximally reduces the stray light, and improves the light receiving quality of the sensor.

In the present embodiment, the polarizer 400 includes a first threaded component 401 connected with the sensor 300. The sensor 300 includes a second threaded component 402 fitted with the first threaded component 401, referring particularly to FIG. 9. Through the fit of the first threaded component 401 and the second threaded component 402, the polarizer 400 and the sensor 300 may be detachably connected. Stray light in any direction can be prevented from entering the sensor 300, the stray light is maximally reduced, the light receiving quality of the sensor is improved, production efficiency can be improved, the sensor can be conveniently replaced in a subsequent use process, and maintenance cost is reduced. The polarizer 400 also plays a certain protective role on the sensor 300, prevents the sensor 300 from being impacted or corroded, and prolongs the service life of the sensor 300.

In the present embodiment, the display device 100 further includes a bonding layer disposed between the sensor 300 and the polarizer. The bonding layer may be annular for better bonding the sensor 300 with the polarizer without affecting an amount of light entering the sensor 300, thereby realizing the integrated arrangement of the sensor 300 and the polarizer.

In the present embodiment, an orthographic projection of the sensor 300 on the polarizer is located within the polarizer. An area of the polarizer is larger than an area of a light receiving entrance of the sensor 300. The polarizer can better prevent the stray light in more directions from entering the sensor 300, maximally reduce the stray light, and improve the light receiving quality of the sensor.

In the present embodiment, the sensor 300 may include any one or a combination of a camera, an optical fingerprint reader, an infrared sensor, and a distance sensor.

In the present embodiment, the display panel 200 further includes a substrate, an array base disposed on the substrate, the liquid crystal layer 250 disposed on the array base, a color film layer disposed at a side of the liquid crystal layer 250 away from the array base, and an encapsulation layer disposed on the color film layer.

In the present embodiment, the array base includes an active layer disposed on the substrate, a first insulating layer disposed on the active layer, a gate layer disposed on the first insulating layer, a second insulating layer disposed on the gate layer, a source drain layer disposed on the second insulating layer, and a third insulating layer disposed on the source drain layer.

In the present embodiment, the source drain layer is electrically connected with the active layer through a plurality of second via holes. The active layer includes a plurality of resistance reducing modules. The resistance reducing modules are electrically connected with the source drain layer. A resistance of the resistance reducing modules is smaller than a resistance of film layers in other regions of the active layer.

In the present embodiment, the backlight module 500 includes a back plate, a driving layer on the back plate, and a light-emitting device layer on the driving layer. The backlight module 500 further includes a light shading module close to the sensor 300. The light shading module is disposed on the backlight module 500 around the sensor 300. The light shading module can reduce light leakage of the backlight module 500 to the sensor 300 and improve the collection efficiency of the sensor 300 for ambient light.

According to the embodiments of the present invention, the polarizer is added between the sensor and the display panel to absorb the stray light parallel to the absorption axis of the polarizer, so that the luminous flux of the stray light emitted to the sensor is reduced, and the light receiving quality of the sensor is improved.

The embodiments of the present invention provide a display device. The display device includes a display panel, a sensor disposed at a first side of the display panel, and a polarizer disposed between the sensor and the display panel. Ambient light is emitted to the sensor through the display panel and the polarizer. A polarization direction of light emitted from the display device to the sensor includes, at least, a first polarization direction. The first polarization direction is parallel to an absorption axis of the polarizer. According to the embodiments of the present invention, the polarizer is added between the sensor and the display panel to absorb stray light parallel to the absorption axis of the polarizer, so that a luminous flux of the stray light emitted to the sensor is reduced, and a light receiving quality of the sensor is improved.

It may be understood that a person of original skill in the art may make equivalent replacement or changes according to the technical solutions and the inventive concept of this application, and such replacement or changes shall fall within the protection scope of this application.

What is claimed is:

1. A display device, comprising a display panel, a sensor disposed at a first side of the display panel, and a polarizer disposed between the sensor and the display panel, wherein ambient light enters the sensor through the display panel and the polarizer, and
wherein a polarization direction of light emitted from the display device to the sensor comprises, at least, a first polarization direction, and the first polarization direction is parallel to an absorption axis of the polarizer, wherein the polarizer comprises an arc surface, a convex surface of the arc surface faces away from the sensor,
wherein the display panel comprises a first polarizing layer disposed on a side of the display panel close to the sensor, a second polarizing layer disposed on a side of the display panel away from the sensor, a liquid crystal layer disposed between the first polarizing layer and the second polarizing layer, and a third polarizing layer disposed between the first polarizing layer and the polarizer,
wherein an absorption axis of the first polarizing layer is perpendicular to an absorption axis of the second polarizing layer, and the absorption axis of the polarizer is parallel to the absorption axis of the first polarizing layer,
wherein the display device comprises a first via hole, the first via hole only penetrates through the third polarizing layer,
wherein an orthographic projection of the first via hole on the sensor is located within the sensor.

2. The display device according to claim 1, wherein the third polarizing layer comprises a dual brightness enhancement film (DBEF) material.

3. The display device according to claim 1, wherein the third polarizing layer and the first polarizing layer are integrally compounded.

4. The display device according to claim 3, wherein the third polarizing layer comprises an advanced polarization conversion film (APCF) material.

5. The display device according to claim 1, wherein the display panel comprises a fourth polarizing layer disposed on a side of the display panel close to the sensor, a second polarizing layer disposed on a side of the display panel away from the sensor, and a liquid crystal layer disposed between the fourth polarizing layer and the second polarizing layer,
wherein the fourth polarizing layer comprises a semi-reflective and semi-transmissive material, a transmission axis and a reflection axis of the fourth polarizing layer are perpendicular to each other, and the transmission axis of the fourth polarizing layer is perpendicular to an absorption axis of the second polarizing layer.

6. The display device according to claim 5, wherein the fourth polarizing layer comprises an advanced polarization conversion film (APCF) material.

7. The display device according to claim 5, further comprising a first via hole, wherein the first via hole penetrates through the fourth polarizing layer.

8. The display device according to claim 1, further comprising a backlight module disposed between the polarizer and the display panel.

9. The display device according to claim 8, wherein a distance between the polarizer and the sensor is smaller than a distance between the polarizer and the backlight module.

10. The display device according to claim 1, wherein the polarizer comprises a first portion parallel to the display panel and a second portion connected with the first portion and surrounding the sensor.

11. The display device according to claim 1, wherein the polarizer and the sensor are integrated.

12. The display device according to claim 11, wherein the polarizer comprises a first threaded component connected with the sensor, and the sensor comprises a second threaded component fitted with the first threaded component.

13. The display device according to claim 1, further comprising: a bonding layer disposed between the sensor and the polarizer, the bonding layer is being disposed annularly.

14. The display device according to claim 1, wherein the sensor comprises any one or a combination of a camera, an optical fingerprint reader, an infrared sensor, and a distance sensor.

* * * * *